July 3, 1951 W. O. BECHMAN ET AL 2,558,922
CRAWLER TRACTOR SHOE AND RUBBER TREAD THEREFOR
Filed July 12, 1947 2 Sheets-Sheet 2
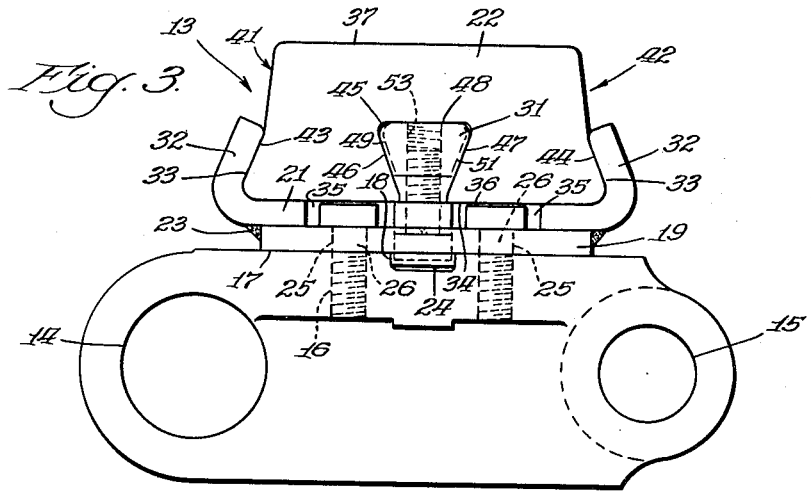
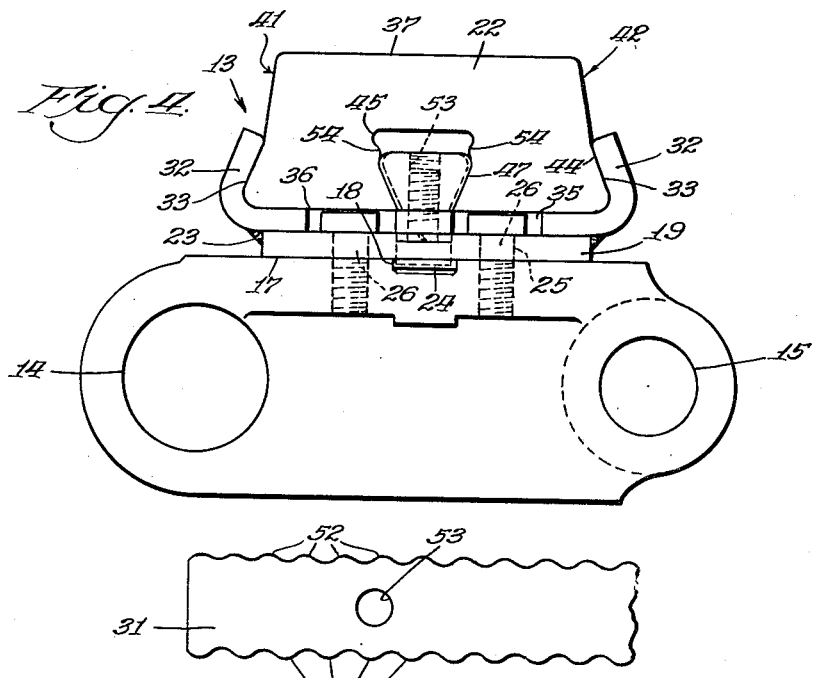
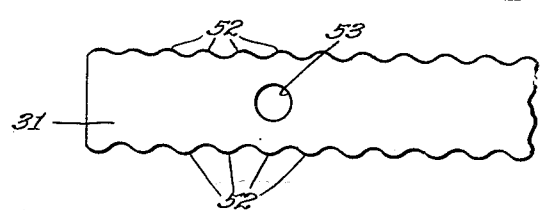
Inventors:
William O. Bechman
William W. Henning
BY Paul O. Pippel
Atty Patented July 3, 1951

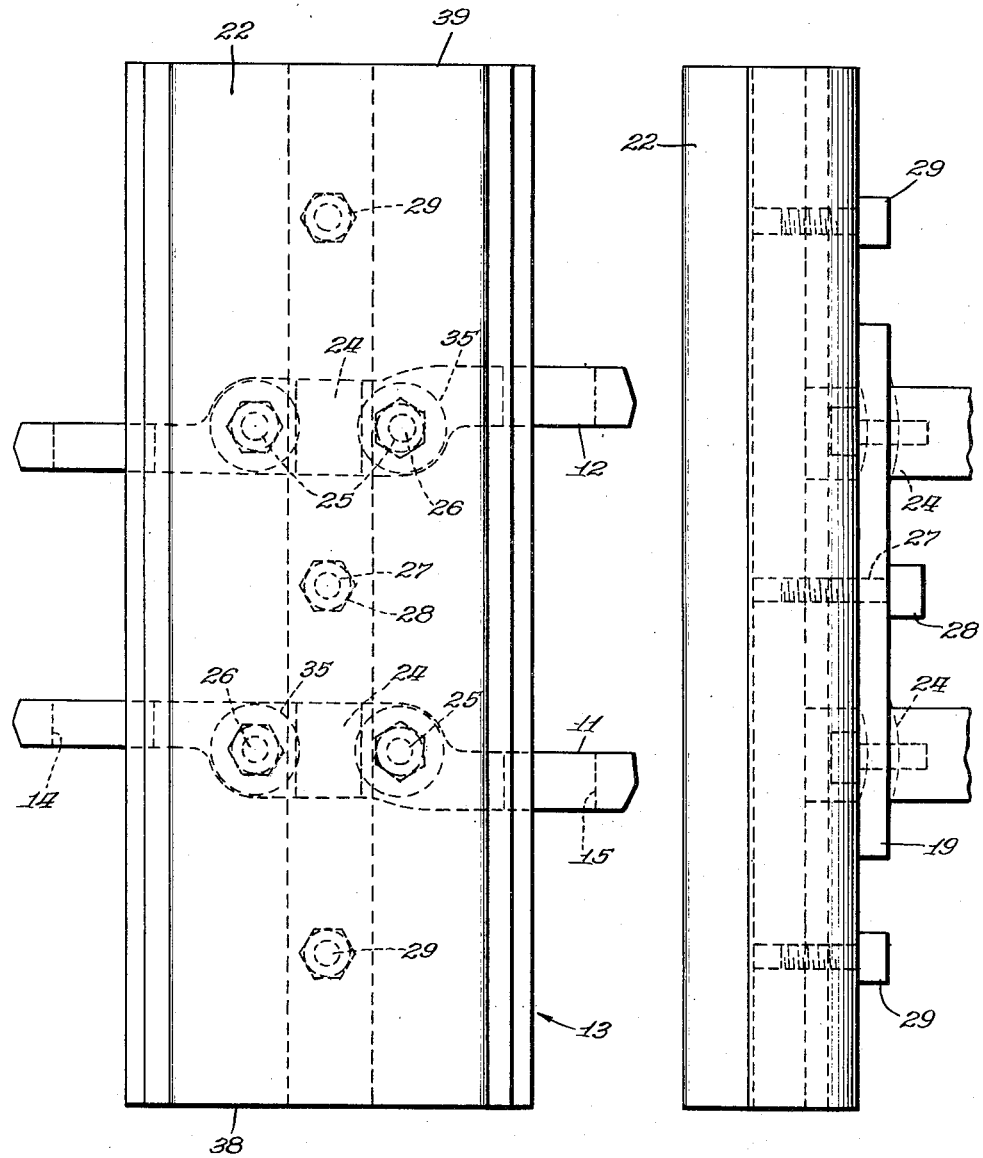

2,558,922

UNITED STATES PATENT OFFICE 2,558,922

CRAWLER TRACTOR SHOE AND RUBBER TREAD THEREFOR

William O. Bechman, Chicago, and William W. Henning, Riverside, Ill., assignors to International Harvester Company, a corporation of New Jersey Application July 12, 1947, Serial No. 760,644

8 Claims. (Cl. 305—10)

This invention concerns crawler tractor shoes and has to do more particularly with a shoe structure embodying a replaceable rubber tread.

The general object of this invention is the provision of an improved means in a track shoe structure for securing this structure to link means of a crawler tractor endless track and an improved ruggedly constructed arrangement for firmly detachably incorporating a rubber tread block into the structure.

This object and sundry specific objects of the invention will become apparent upon reading the ensuing description with reference to the annexed drawings, wherein:

Fig. 1 is a plan view of a track shoe structure constituting a preferred embodiment of the invention and illustrating the attachment of the structure to a pair of crawler tractor track links.

Fig. 2 is a side elevational view of the structure illustrated in Fig. 1.

Fig. 3 is an end view of the structure illustrated in Fig. 1 and showing a clamping bar for the rubber tread block in a released position.

Fig. 4 is a view similar to Fig. 3 but showing the clamping bar in its clamping position.

Fig. 5 is a fragmentary plan view of the locking bar.

A pair of complemental track links 11 and 12 serve as a mounting means for the track shoe structure which is generally designated 13. Each of the track links has bearing holes 14 and 15 at respective ends thereof for the reception of pins (not shown) which constitute means for spacedly connecting the links 11 and 12 and as means for pivotally connecting these links with similar links extending lengthwise thereof in the formation of the endless track. Each track link 11 and 12 has a pair of threaded openings 16 extending downwardly within an upper face 17 thereof and a seat 18 in the form of a transverse groove in the face 17 between the openings 16.

The track shoe structure 13 comprises a rectangular base plate 19 welded to the back side of a flanged retaining plate 21 in which a rectangular rubber tread block 22 is detachably secured. The welded connection between the plates 19 and 21 is indicated at 23.

The base plate 19 has a pair of bosses 24 formed therein by depressing localized areas of the plate while it is at sufficient temperature to expedite flowing of the material by forging action. These bosses 24 fit into the seats 18 of the track links. Said base plate also has four holes 25 for receiving the shanks of headed bolts 26 for attaching the shoe structure to the track links, the threaded shanks of these bolts 26 being turned into the threaded openings 16 for this purpose. An additional hole 27 is formed centrally in the base plate 19 for receiving the shank of a bolt 28 which cooperates with two additional bolts 29 for drawing a clamping bar 31 into clamping relation with respect to the tread block 22.

Flanges 32 extend in parallelism along opposite sides of the retaining plate 21, and these flanges are bent inwardly so that their inner opposed faces 33 converge as they extend from the outer face 34 of such plate. Apertures 35 in the plate 21 accommodate the heads of the bolts 26 so that these bolt heads will not be embedded in a flat base face 36 of the tread block 22 when the parts are assembled. Also, disposal of the heads of the bolts 26 below the surface 34 of the plate 21 facilitates endwise sliding of the block 22 into initial assembly with the clamping plate.

Referring now to the detailed construction of the tread block 22, this tread block is in the general shape of parallelopiped. This block has a flat tread face 37 opposite to the base face 36, end faces 38 and 39 and edge faces 41 and 42. Portions 43 and 44 of said edge faces adjacently to the base face 36 extend angularly from junctions of said face portions with the remainder of such faces along lines registering with the upper edges of the flanges 32 as illustrated in Figs. 3 and 4, wherefore these face portions 43 and 44 converge as they extend from said base face 36 so as to fit flatly against the converging faces 33 of the retaining plate flanges 32.

A groove 45 generally keystone in section extends lengthwise of the block 22 across the base face 36. Flat sides 46 and 47 of the groove 45 converge as they extend from the bottom 48 of this groove toward the face 36 of the block 22.

After the tread block 22 has been inserted into position between the flanges 32, the locking bar 31 is inserted endwise into the groove 45. This locking bar has converging sides 49 and 51 which are traversed by projections or ribs 52 which are visible in Figs. 3, 4 and 5. When the locking bar is completely inserted into the groove 45, threaded holes 53 therein respectively aline with the shanks of bolts 28 and 29 so that when these bolts are rotated their shanks will enter the threaded holes 53 and draw the bar 31 downwardly into clamping relation with respect to the tread block as illustrated in Fig. 4. As the clamping bar is drawn toward the plate 21, that portion of the block between the inner sides of the flanges 32 and the ribbed faces 49 and 51 of the locking bar will be gripped firmly as the material of the block is compressed and partially displaced as illustrated by bulges 54 in Fig. 4. Although this specification and claims refer to the tread block 22 as being formed of rubber, which when vulcanized causes it to have the desired elastic-flowable and wear characteristics, it is contemplated that the term "rubber" shall connote rubber substitutes or materials of like physical characteristics. It is also contemplated that the term "rubber" shall not exclude tread blocks which contain reenforcing fabric or other reenforcing material.

The transverse ribs 52 upon the locking bar 31 extend generally in the direction of transverse movement of this bar when it is forced from the relaxed condition shown in Fig. 3 to the stressed or clamping position illustrated in Fig. 4 so that these ribs minimize resistance to movement of the bar as it slides upon the contiguous rubber faces. These ribs 52 are, however, embedded into the contiguous portions of the rubber block and thereby preclude endwise movement of the block from assembly with the track shoe structure.

Having thus described a single preferred embodiment of the invention with the view of clearly and concisely illustrating the same, we claim:

1. A crawler tractor tread block of rubber, said block having a base face, a tread face opposite to said base face, end faces and side faces, there being a clamping-means-receiving groove of keystone section in and extending endwise of the base face, the opposite sides of said groove converging toward said base face, and portions of the side faces of said block adjacent the base face thereof extending angularly from junctions of said face portions with respect to the remainder of such side faces and diverging toward said base face.

2. The combination set forth in claim 1, wherein the bottom of said groove is spaced more distantly from the base face of the block than the junctions of the side face portions with the remainder of said side faces.

3. The combination set forth in claim 1, wherein the converging sides of the groove reach at least substantially as far as said converging side face portions from the base face of said block.

4. In a track shoe structure for attachment to track link means of a crawler tractor, a tread-block retaining plate having parallel retaining flanges with respective sides extending along opposite edges of said plate and projecting over a face thereof in opposed converging relation, a rubber block having a base face in contiguous relation to said face of the plate and diverging side face portions in contiguity with and embraced by said sides of the flanges, said block also having a groove in its base face in parallelism with said flanges, said groove having opposed flat faces converging from the bottom of such groove toward the base face of the block, an elongated clamping bar of keystone section disposed in said groove with opposite converging sides in respective contiguity with the converging faces of the groove, and means for drawing the clamping bar toward the retaining plate incident to compressing and gripping the block between said sides of the clamping bar and said sides of the retaining flanges.

5. The combination set forth in claim 4, wherein there are projections upon at least one of said clamping bar sides for being embedded into the block incident to the drawing of the clamping bar toward the plate.

6. The combination set forth in claim 4, wherein there are ribs upon the sides of said bar and extending transversely thereof to faciiltate sliding thereof into embedded relation with the block as the bar is drawn toward the plate.

7. In a track-shoe structure for attachment to a track link having a threaded recess therein, a base plate for attachment to said track link and having an opening for the reception of the shank of a headed bolt for attaching said plate to the link, a flanged rubber-tread retaining plate secured to the base plate and having a face opposite therefrom for engagement by a rubber tread block retained by said plate, and said retaining plate also having an aperture alined with the aperture of said base plate and for receiving the head of said bolt as an expedient for preventing the bolt head being embedded into the rubber block.

8. In a track-shoe structure for attachment to spaced apart track links having seats and threaded recesses therein, a base plate having apertures for respective alinement with the track link recesses for receiving the shanks of headed bolts for attaching said plate to the links, said base plate also having bosses projecting therefrom for respective disposal in the track link seats, a flanged rubber-tread retaining plate secured to said base plate and having a face opposite from said base plate for contact by a rubber tread block detachably retained in said retaining plate, and said retaining plate also having apertures of greater diameter than the apertures in the base plate and respectively alined therewith for receiving the heads of said bolts and thereby precluding the bolt heads being embedded in the rubber block.

WILLIAM O. BECHMAN.
WILLIAM W. HENNING.

REFERENCES CITED

The following references are of record in the file of this patent:

UNITED STATES PATENTS

| Number | Name | Date |
|---|---|---|
| 2,064,890 | Dorst | Dec. 22, 1936 |

FOREIGN PATENTS

| Number | Country | Date |
|---|---|---|
| 291,903 | Great Britain | June 14, 1928 |